United States Patent [19]

Kaufman et al.

[11] 4,284,548

[45] Aug. 18, 1981

[54] AMBIENT TEMPERATURE CURABLE HYDROXYL CONTAINING POLYMER/SILICON COMPOSITIONS

[75] Inventors: Lawrence G. Kaufman, North Bergen; Charles N. Merriam, Martinsville, both of N.J.; Enrico J. Pepe, Amawalk, N.Y.

[73] Assignee: Union Carbide Corporation, New York, N.Y.

[21] Appl. No.: 974,614

[22] Filed: Dec. 29, 1978

[51] Int. Cl.$^3$ ............................ C08F 8/32; C08F 8/42; C08C 19/00
[52] U.S. Cl. ........................................ 260/38; 525/342; 525/102; 525/403; 525/523; 528/87; 528/404; 260/42.26
[58] Field of Search ......................... 526/29; 525/102; 528/87, 404; 260/38 R, 42.26

[56] References Cited

U.S. PATENT DOCUMENTS

| | | | |
|---|---|---|---|
| 3,247,281 | 4/1966 | Gagliardi | 260/825 |
| 3,252,278 | 5/1966 | Marzocchi et al. | 57/153 |
| 3,252,825 | 5/1966 | Marzocchi et al. | 117/126 |
| 3,266,612 | 1/1968 | Baldwin et al. | 525/342 |
| 3,408,420 | 10/1968 | Wiggill | 260/827 |
| 3,907,974 | 9/1975 | Smith | 428/346 |
| 3,981,851 | 9/1976 | Plueddemann | 526/267 |
| 4,098,840 | 7/1978 | Yoshida et al. | 526/29 |

FOREIGN PATENT DOCUMENTS 2343079 9/1977 France .

*Primary Examiner*—William F. Hamrock
*Attorney, Agent, or Firm*—Bernard F. Crowe

[57] ABSTRACT

Ambient temperature curable compositions comprising a hydroxyl containing organic polymer and an aminoorganosilicon acylamino compound, said compositions being useful as protective coating compositions.

43 Claims, No Drawings

AMBIENT TEMPERATURE CURABLE HYDROXYL CONTAINING POLYMER/SILICON COMPOSITIONS

BACKGROUND OF THE INVENTION

This invention relates to novel room temperature curable compositions comprising a hydroxyl containing organic thermoplastic polymer and an aminoorganosilicon acylamino compound, as well as to the crosslinked products derived from said compositions.

The employment of organosilanes to aid in the crosslinking of polymeric materials is well known in the art. However, heretofore in order to obtain room temperature curable compositions the prior art has had to prereact the starting organic polymer with the organosilane at elevated temperatures. One exception to such methods has been the use of halosilanes which are known to react at room temperature with hydroxyl containing polymers, however, this procedure has the disadvantage of also producing an undesirable acid by-product, e.g. hydrogen chloride, which if not removed may have a deleterious effect on the performance of the cured composition. In addition assignee's U.S. application Ser. No. 961,473 pending filed Nov. 16, 1978, discloses the preparation of ambient temperature curable hydroxyl containing polymer/aminosilicon compositions which silicon compounds are free of acrylamino groups.

SUMMARY OF THE INVENTION

It has now been discovered that room temperature curable polymer compositions can also be easily prepared at room temperature by simply mixing a hydroxyl containing organic thermoplastic polymer with certain hydrolyzable aminoorganosilicon acylamino compounds without also resulting in undesirable by-products.

Thus, it is an object of this invention to provide room temperature curable compositions comprising a hydroxyl containing organic thermoplastic polymer and a hydrolyzable aminoorganosilicon acylamino compound. It is another object of this invention to provide cured cross-linked products, e.g. solvent resistant coatings, derived from the curable compositions of this invention. Other objects and advantages of this invention will become readily apparent from the following description and appended claims.

More specifically one aspect of this invention may be described as a substantially anhydrous, acid-free, room temperature curable composition which comprises (A) an organic thermoplastic polymer containing at least two hydroxyl radicals which are directly bonded to noncarboxylic carbon atoms of said polymer; and (B) a hydrolyzable aminoorganosilicon acylamino compound having the formula

and mixtures thereof wherein: X is an alkoxy radical having 1 to 6 carbon atoms; R is a divalent alkylene radical having 1 to 4 carbon atoms; $R^1$ is hydrogen or an alkyl radical having 1 to 4 carbon atoms; $R^2$ is a divalent alkylene radical having 2 to 4 carbon atoms; $R^3$ is a radical selected from the group consisting of hydrogen, an alkyl radical having 1 to 20 carbon atoms or a phenyl radical; $R^4$ is a radical selected from the group consisting of an alkyl radical having 1 to 20 carbon atoms, a phenyl radical or a silyl radical of the formula:

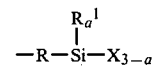

wherein X, R and $R^1$ are the same as defined above; Q is a radical selected from the group consisting of hydrogen, an alkyl radical of 1 to 4 carbon atoms, a phenyl radical or an ester radical of the formula $-COOR^5$ wherein $R^5$ is an alkyl radical having 1 to 4 carbon atoms; and wherein a has a value of 0 to 2 and t and x each have a value of 0 to 4, with the proviso that when x is at least 1, $R^4$ can also be hydrogen; and wherein said composition contains about 5 to 50 parts by weight of said hydrolyzable aminoorganosilicon acylamino compound (B) per 100 parts by weight of said organic polymer (A).

DESCRIPTION OF THE PREFERRED EMBODIMENTS

Any hydroxyl containing organic thermoplastic polymer having at least two hydroxyl radicals which are directly bonded to non-carboxylic

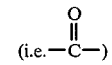

carbon atoms can be employed as the organic polymer component of the room temperature (i.e. ambient) curable compositions of this invention. Such types of hydroxyl containing organic polymers and/or methods for their preparation are well known in the polymer art. Of course it is to be understood that the hydroxyl containing organic themoplastic polymers employable in this invention include homopolymers, copolymers, terpolymers and the like and that mixtures of more than one type or class of polymers can be employed if desired. Likewise, it is to be understood that the particular proportions of polymer units and molecular weights of the hydroxy containing organic thermoplastic polymer components of this invention are not generally critical to the invention. Illustrative examples of such hydroxyl containing organic thermoplastic polymers include:

(a) Hydroxyalkyl acrylate modified vinyl chloride polymers such as the uniformly random hydroxyl-functional copolymers or terpolymers of (i) vinyl chloride; (ii) hydroxyalkyl acrylate having 2 to 4 carbons in the alkyl segment; and, optionally, (iii) a polymerizable monomer chosen from alkyl (1–8 carbon) esters of polymerizable alpha, beta-ethylenically unsaturated acids such as acrylic, methacrylic, maleic, fumaric, itaconic and the like, and vinyl esters of saturated fatty acids of 1–6 carbon atoms, such as vinyl acetate, vinyl propionate and the like. Suitable hydroxyl-functional copolymers and terpolymers are described in U.S. Pat. No. 3,884,887 and U.S. Pat. No. 3,755,271.

(b) Polyether polyol polymers such as the alkylene oxide adducts of water or a polyhydric organic compound as the initiator or starter, e.g. illustrative initiators which may be used individually or in combination include ethylene glycol; diethylene glycol; propylene glycol; 1,5-pentanediol; hexylene glycol; dipropylene glycol; trimethylene glycol; 1,2-cyclohexanediol; 3-cyclohexane-1,1-dimethanol and dibromo-derivative thereof; glycerol; 1,2,6-hexanetriol; 1,1,1-trimethyolethane; 1,1,1-trimethylpropane; 3-(2-hydroxyethoxy)- and 3-(2-hydroxypropoxy)-1,3-propanediols; 2,4-dimethyl-2-(2-hydroxyethoxy)methylpentanediol-1,5; 1,1,1-tris[2-hydroxyethoxy)methyl]ethane; 1,1,1-tris[2-hydroxypropoxy)methyl]propane; pentaerythritol; sorbitol; sucrose; alphamethyl methyl glucoside; and other such polyhydric compounds consisting of carbon, hydrogen and oxygen and having usually not more than about 15 carbon atoms per molecule. Illustrative alkylene oxides include ethylene oxide, propylene oxide, butylene oxide as well as various mixtures of such oxides. Also included among the polyether polyol polymers useful herein are poly(hydroxyethers) derived from diphenols and epichlorohydrin, e.g. phenoxy resins, as well as those polymers commonly referred to in the art as polymer/polyether polyols which may be produced by polymerizing one or more ethylenically unsaturated monomers dissolved or dispersed in any of the above described alkylene oxide adduct polyols. Illustrative of such unsaturated monomers which may be employed individually or in combination include ethylene, propylene, acrylonitrile, methacrylonitrile, vinyl chloride, vinylidene chloride, styrene, alpha-methylstyrene, butadiene, and the like.

(c) Polyhydroxy containing acrylic polymers such as the copolymers and terpolymers of hydroxyalkyl acrylates having 2 to 4 carbon atoms in the alkyl segments and alkyl acrylates and/or alkyl methacrylates having 1 to 6 carbon atoms in the alkyl segments.

(d) Polyvinyl alcohol polymers such as the hydrolyzed or partially hydrolyzed polymers derived from the homopolymers of vinyl esters of saturated fatty acids of 1-6 carbon atoms or the copolymers of said vinyl esters and one or more ethylenically unsaturated monomers such as ethylene, propylene, butylene, acrylonitrile, methacrylonitrile, vinyl chloride, vinylidene chloride, styrene, alpha-methylstyrene, butadiene, and the like.

(e) Polyhydroxy containing polyvinyl acetal polymers such as polyvinylbutyral resins and the like.

(f) Polyester polyol polymers such as the reaction products of polyfunctional organic carboxylic acids and polyhydric alcohols, which reaction products contain at least two hydroxyl groups (as alcoholic OH) per molecule, and cyclic ester polymers containing at least two hydroxyl groups per molecule prepared from epsilon caprolactone or other lactones and the copolymers of such lactones with polyhydric alcohols.

Typical of the polyfunctional organic carboxylic acids that can be employed in producing polyester polyols useful in this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The polyhydric alcohols (organic polyols) that can be employed in producing the polyester polyol starting material useful in this invention include the monomeric polyhydric alcohols such as, for example, glycerol; 1,2,6-hexanetriol; ethylene glycol; diethylene glycol; trimethylol propane; trimethyolethane; pentaerythritol; propylene glycol; 1,2-, 1,3- and 1,4-butylene glycols; 1,5-pentanediol; sorbitol; and the like, including mixtures thereof.

Other polyhydric alcohols that can be employed in producing the polyester polyols useful in this invention are the polymeric polyhydric alcohols which include the linear and branched chain polyethers having a plurality of acyclic ether oxygens and at least two alcoholic hydroxyl radicals. Illustrative of such polyether polyols are the poly(oxyalkylene) polyols containing one or more chains of connected oxyalkylene radicals which are prepared by the reaction of one or more alkylene oxides with acyclic and alicyclic polyols. Examples of the poly(oxyalkylene) polyols include the poly(oxyethylene) glycols prepared by the addition of ethylene oxide to water, ethylene glycol or diethylene glycol; poly(oxypropylene) glycols prepared by the addition of propylene oxide to water, propylene glycol or dipropylene glycol; mixed oxyethylene-oxypropylene polyglycols prepared in a similar manner utilizing a mixture of ethylene oxide or a sequential addition of ethylene oxide and propylene oxide; and the poly(oxybutylene) glycols and copolymers such as poly(oxyethylene-oxybutylene) glycols and poly(oxypropylene-oxybutylene) glycols. Included in the term "poly(oxybutylene) glycols" are polymers of 1,2-butyleneoxide and 2,3-butyleneoxide.

Illustrative of further polyester polyols are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane, 1,2,6-hexanetriol; pentaerythritol; sorbitol; glycosides such as methyl, ethyl, propyl, butyl and 2-ethylhexyl arabinoside, xyloside, fructoside, glucoside, and rhammoside; sucrose; mononuclear polyhydroxybenzenes such as resorcinol, pyrogallol, phloroglucinol, hydroquinone, 4,6-di-tertiarybutylcatechol, and catechol; polynuclear hydroxybenzenes ("polynuclear" designating at least two benzene nuclei) such as the di-, tri- and tetraphenylol compounds in which two to four hydroxybenzene groups are attached either directly by means of single bonds or through an aliphatic hydrocarbon radical containing one to twelve carbon atoms, such compounds being typically illustrated by 2,2-bis(p-hydroxyphenyl)-propane, bis(p-hydroxyphenyl)-methane and the various diphenols and diphenol methanes disclosed in U.S. Pat. Nos. 2,506,486 and 2,744,882, respectively. Another type of polyester polyol is that produced by reaction of a polycarboxylic acid and the polyether adducts formed by reaction of ethylene oxide, propylene oxide or butylene oxide with phenol-formaldehyde condensation products such as the novolaks.

(g) Phenolic resin polymers such as the solid resoles and novolak resins disclosed in copending U.S. application Ser. No. 765,300 filed Feb. 3, 1977, U.S. Pat. No. 4,116,921 and British Pat. No. 1,417,437. The phenol of the resin can be unsubstituted phenol or substituted such as cresol, bisphenol-A, para-substituted phenols and the like while formaldehyde or a material that generates formaldehyde in situ is the aldehyde employed in making phenol resins. The preferred phenolic resins are resoles produced by reacting formaldehyde with bisphenol-A at elevated temperatures in the presence of a base-catalyst and having a neutralized pH of about 3 to 8.

The preferred hydroxyl containing organic thermoplastic polymer components of this invention are the hydroxyalkyl acrylate modified vinyl chloride polymers described above having (a) from about 50 to 85 weight percent vinyl chloride derived mer units; (b) from 0 to 10 weight percent mer units derived from a polymerizable monomer selected from the class consisting of alkyl esters of alpha, beta-ethylenically unsaturated carboxylic acids as described above and vinyl esters of saturated fatty acids as described above, the preferred polymerizable monomer being vinyl acetate, and (c) from 10 to 30 weight percent mer units derived from hydroxyalkyl acrylate as described above, preferably hydroxypropyl acrylate. The most preferred polymer being a uniformly hydroxyl-functional random terpolymer of about 80 weight percent vinyl chloride mer units, about 5 weight percent vinyl acetate mer units and about 15 weight percent hydroxypropyl acrylate mer units.

With regard to the aminoorganosilicon acylamino compounds and mixtures thereof of Formula I above it is to be understood that each X, R, $R^1$, $R^2$, $R^3$, $R^4$, a, t and x may be the same or different in any given silicon compound and mixtures thereof. Moreover, illustrative radicals represented by X above include alkoxy radicals having 1 to 6 carbon atoms, such as methoxy, ethoxy, propoxy, 2-methoxyethoxy, isopropoxy, hexyloxy and the like, the preferred alkoxy radical being methoxy. Illustrative divalent alkylene radicals represented by R above include methylene, ethylene, propylene, isopropylene, butylene and the like, the preferred divalent alkylene groups being ethylene (—$C_2H_4$—) and propylene (—$C_3H_6$—). Illustrative radicals represented by $R^1$ above include alkyl radicals such as methyl, ethyl, propyl, isopropyl, butyl and the like. Illustrative divalent alkylene radicals represented by $R^2$ above include ethylene, propylene, isopropylene, butylene, and the like, the preferred divalent alkylene groups being ethylene and propylene. Illustrative radicals represented by $R^3$ above include hydrogen, phenyl and alkyl radicals having from 1 to 20 carbon atoms such as methyl, ethyl, propyl, octyl, octadecyl, eicosyl and the like. Preferably $R^3$ is hydrogen. Illustrative radicals represented by $R^4$ above include hydrogen, phenyl, alkyl radicals having from 1 to 20 carbon atoms such as methyl, ethyl, propyl, octyl, octadecyl, eicosyl, and the like as well as silyl groups of the formula

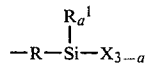

wherein R, $R^1$, X and a are the same as defined above. Preferably $R^4$ represents a silyl group. Illustrative radicals represented by Q above include hydrogen, phenyl, alkyl radicals having from 1 to 4 carbon atoms such as methyl, ethyl, propyl, butyl and the like, as well as ester radicals of the formula

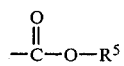

wherein $R^5$ represents an alkyl radical having from 1 to 4 carbon atoms such as methyl, ethyl, propyl, butyl, and the like. Preferably Q is hydrogen. In the more preferred aminoorganosilicon acylamino compounds of this invention a is preferably 0.

The aminoorganosilicon acylamino compounds employed in this invention, as well as methods for their preparation, are those disclosed in assignee's concurrently filed U.S. application Ser. No. 974,615 pending entitled "Aminoorganosilicon Acylamino Compounds", the entire disclosure of which is encompassed herein by reference thereto.

For instance, the aminoorganosilicon acylamino compounds can be prepared by following simple processing procedures involving the use of Michael addition products as the starting materials. For example, aminosilane compounds of the formula

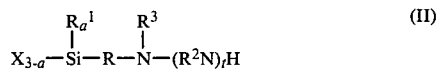

wherein X, R, $R^1$, $R^2$, $R^3$, a and t are the same as defined above can be reacted with an olefinic carboxylate ester by the Michael addition method to form the corresponding amino-carboxylic acid ester of the silane and carboxylate materials employed as seen by the following illustration:

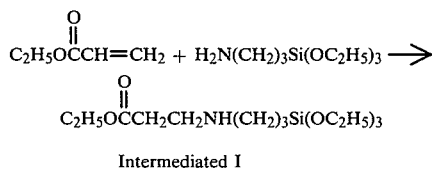

Intermediated I

The amino-carboxylic acid ester-silane intermediate product so formed can then be subsequently amidated with either (1) a primary amino silicon compound of Formula (II) above, (2) a primary organoamine, or (3) a primary organic polyamine to produce the aminoorganosilicon acylamino compounds depicted by Formula (I) above as seen by the following illustrations

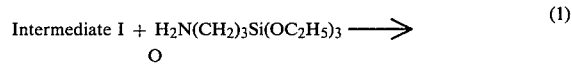
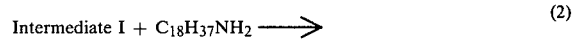
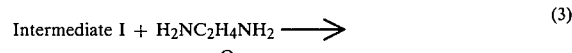
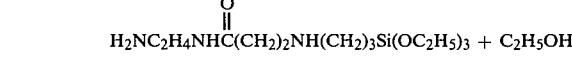

The amino-carboxylic acid ester containing silane compounds employable as the starting materials for such types of processes as depicted above and/or the Michael addition method for their preparation are well known in the art as seen for example by U.S. Pat. No. 2,929,829 and may be illustrated by the following formula

wherein R, $R^1$, $R^2$, $R^3$, Q, X, a and t are the same as defined above and $R^6$ is a monovalent hydrocarbon radical, preferably an alkyl radical having 1 to 4 carbon atoms such as methyl, ethyl, propyl, butyl, and the like.

Illustrative examples of olefinic carboxylate compounds which may be employed in such a Michael addition process include those of the formula $$Q(CH)=C(Q)COOR^6 \tag{IV}$$

wherein Q and $R^6$ are the same as defined above such as, $CH_2=CHCOOC_2H_5$; $CH_2=CHCOOCH_3$; $CH_2=C(CH_3)COOCH_3$; $CH_3CH=CHCOOC_2H_5$; $C_6H_5CH=CHCOOC_2H_5$; $CH_3OOCCH=CHCOOCH_3$; and the like.

Illustrative aminosilanes that can be employed in such a Michael addition process include those of Formula (II) above such as
$(CH_3O)_3SiCH_2NH_2$
$(C_2H_5O)_3Si(CH_2)_3NH_2$
$(CH_3O)_3Si(CH_2)_3NH_2$
$(CH_3O)_3Si(CH_2)_3NHCH_3$
$(C_3H_7O)_3Si(CH_2)_3NH_2$
$(CH_3OC_2H_4O)_3Si(CH_2)_3NH_2$
$(C_2H_5O)_2CH_3Si(CH_2)_3NH_2$
$(C_2H_5O)_2C_2H_5Si(CH_2)_3NH_2$
$(C_2H_5O)_3SiCH_2CH_2NH_2$
$(C_2H_5O)_3SiCH_2CH_2CH(CH_3)NH_2$
$(C_2H_5O)_3Si(CH_2)_4NH_2$
$(CH_3O)_3Si(CH_2)_3NH(CH_2)_2NH_2$
$(C_4H_9O)_2(CH_3)Si(CH_2)_3NHCH_3$
$(CH_3O)_3Si(CH_2)_3(NHC_2H_4)_2NH_2$
$(CH_3O)_3Si(CH_2)_3(NHC_2H_4)_3NH_2$
$(C_2H_5O)_3Si(CH_2)_3(NHC_2H_4)_4NH_2$
$(C_2H_5O)_2CH_3Si(CH_2)_4NH_2$
$(CH_3O)(CH_3)_2Si(CH_2)_4NH_2$
$(CH_3O)_3Si(CH_2)_3NHC_4H_9$
$(C_2H_5O)_3Si(CH_2)_3NHCH_3$
$(C_2H_5O)_3SiCH_2CH(CH_3)NH_2$
and the like.

The processing conditions of said Michael addition are well known and taught e.g. in U.S. Pat. No. 2,929,829 and in this instance, merely involve forming a mixture of about 1 mole of the aminosilicon compound and about one mole of the olefinic carboxylate compound and maintaining the mixture at a temperature, preferably about room temperature, until the aminosilicon compound has added to the double bond of the olefinic carboxate thereby producing the desired Michael addition product.

As pointed out above the aminoorganosilicon acylamino compounds used in this invention as shown by Formula (I) above can be produced by amidating an amino-carboxylic acid ester containing silane of Formula (III) above with either (1) a primary aminosilane compound of Formula (II) above; (2) a primary organic amine or (3) a primary organic polyamine.

Illustrative primary aminosilane reactants include those of the formula $$\overset{R_a^1}{\underset{X_{3-a}Si-R(NR^2)_tNH_2}{|}} \overset{R^3}{|} \tag{V}$$

wherein R, $R^1$, $R^2$, $R^3$, X, a and t are the same as defined above such as
$(CH_3O)_3SiCH_2NH_2$
$(C_2H_5O)_3Si(CH_2)_3NH_2$
$(CH_3O)_3Si(CH_2)_3NH_2$
$(CH_3O)_3Si(CH_2)_4NH_2$
$(C_3H_7O)_3Si(CH_2)_3NH_2$
$(CH_3OC_2H_4O)_3Si(CH_2)_3NH_2$
$(C_2H_5O)_2CH_3Si(CH_2)_3NH_2$
$(C_2H_5O)_2C_2H_5Si(CH_2)_3NH_2$
$(C_2H_5O)_3SiCH_2CH_2CH(CH_3)NH_2$
$(C_2H_5O)_3Si(CH_2)_4NH_2$
$(CH_3O)_3Si(CH_2)_3NH(CH_2)_2NH_2$
$(CH_3O)_3Si(CH_2)_3(NHC_2H_4)_2NH_2$
$(CH_3O)_3Si(CH_2)_3(NHC_2H_4)_3NH_2$
$(C_2H_5O)_3Si(CH_2)_3(NHC_2H_4)_4NH_2$
$(C_2H_5O)_2(CH_3)Si(CH_2)_4NH_2$
$(CH_3O)(CH_3)_2Si(CH_2)_4NH_2$
$(C_2H_5O)_3SiCH_2CH(CH_3)NH_2$
and the like.

Illustrative primary organic amines include those of the formula $$R^7NH_2 \tag{VI}$$

wherein $R^7$ is a monovalent hydrocarbon radical having from 1 to 20 carbon atoms, such as methylamine, ethylamine, propylamine, octylamine, octadecylamine, eicosylamine, phenylamine, and the like.

Illustrative primary organic polyamines include those of the formula $$\overset{R^3}{\underset{R^4(N-R^2)_b-NH_2}{|}} \tag{VII}$$

wherein $R^2$, $R^3$, $R^4$ and $R^4$ are the same as defined above, and b has a value of 1 to 4, such as
$H_2NCH_2CH_2NH_2$
$H[NHCH_2CH_2]_2NH_2$
$H[NHCH_2CH_2]_3NH_2$
$H[NHCH_2CH_2]_4NH_2$
$H_2NCH_2CH_2CH_2NH_2$
$H[NHCH_2CH_2CH_2]_2NH_2$
$H(CH_3)NCH_2CH_2NH_2$
$H(C_2H_5)NCH_2CH_2NH_2$
$H(C_4H_9)NCH_2CH_2CH_2NH_2$
$H(C_6H_5)NCH_2CH_2NH_2$
$(CH_3)_2NCH_2CH_2NH_2$
$(C_2H_5)_2NCH_2CH_2NH_2$
$H_2NCH_2CH_2NHCH_2CH_2CH_2NH_2$
and the like.

Of course, it is obvious that the particular choice of amidation processes will merely depend upon which type of silane product is desired and that all three of the above depicted amidation processes can be carried out merely by forming a mixture of a carboalkoxyalkylaminoorganosilane such as shown in Formula (III) above with any of the amino compounds shown in Formulas (V), (VI) or (VII) above and maintaining the mixture at a temperature at which the carboalkoxy group and primary amino group react to produce the desired aminoorganosilicon acylamino compound.

The relative amounts of the two reactants used as the starting materials for said above amidation processes is not narrowly critical. For example, from one to ten chemical equivalents of primary amine starting materials of Formulas (V), (VI) or (VII) can be employed for each mole of the carboalkoxyalkylaminosilane of Formula III above. However, an excess of such primary amine reactants is not desirable unless the unreacted excess can be readily removed from the reaction mixture or does not interfere with the intended use of the desired silane condensation product. In general, however, when the amino starting material is an aminosilane of Formula (V) above or a primary amine of Formula (VI) above or a primary polyamine of Formula (VII) above that contains only one primary amino group it is preferred that the carboalkoxyalkylaminoorganosilane starting material be reacted with a stoichiometric amount (1 mole to 1 mole) of said amino starting materials. On the other hand, when the amino starting material is a primary polyamine of Formula (VII) above that contains two primary amino groups it is essential to employ a stoichiometric excess of said polyamine in order to avoid producing bis-silylated compounds containing more than a single acylamino group. Moreover, while it is preferred to prepare the aminoorganosilicon acylamino compounds used in this invention by first forming the amino carboxylic acid ester containing silane intermediate of Formula (III) above and then reacting said intermediate with the primary amino starting material it is to be understood that, if desired the bis silylated compounds used in this invention can also be prepared in a single step for example, by reacting an olefinic compound of Formula (IV) above that contains only one carboalkoxy group with a primary aminosilane of Formula (V) above using a mole ratio of 0.5 moles of the carboxylate compound to 1 mole of the aminosilane. It is generally preferred to employ an olefinic carboxylate starting material which contains the same type of alkoxy group as the alkoxy radicals of the aminosilane starting material since when different alkoxy groups are involved (e.g. in the reaction of methyl acrylate and a triethoxy containing silane starting material the process can lead to a mixed methoxy-ethoxy silane adduct intermediate and/or an acylamino containing mixed methoxy-ethoxy silane product.

The above amidation processes may be carried out over a wide range of temperatures such as from 0° C. to 200° C.; however, it is generally preferred to employ a temperature in the range of from about 25° C. to about 150° C. The by-product alcohol may be removed by any conventional method such as by distillation and pressures other than atmospheric pressure may be used to aid in the removal of the alcohol if desired. Of course, it is to be understood that the aminoorganosilicon acylamino compounds for this invention can be employed in their crude product form or purified if desired after removal of the alcohol by any conventional method such as further distillation. Moreover, it is often desirable to employ a catalyst to accelerate the condensation reaction (amidation) between the carboalkoxy group and primary amino group of the starting materials. Illustrative catalysts which may be employed for this purpose are the tin catalysts described in U.S. Pat. No. 2,890,208 as well as other metal catalysts such as those described in U.S. Pat. No. 3,169,945.

Accordingly, illustrative aminoorganosilicon acylamino compounds used in this invention include such compounds as

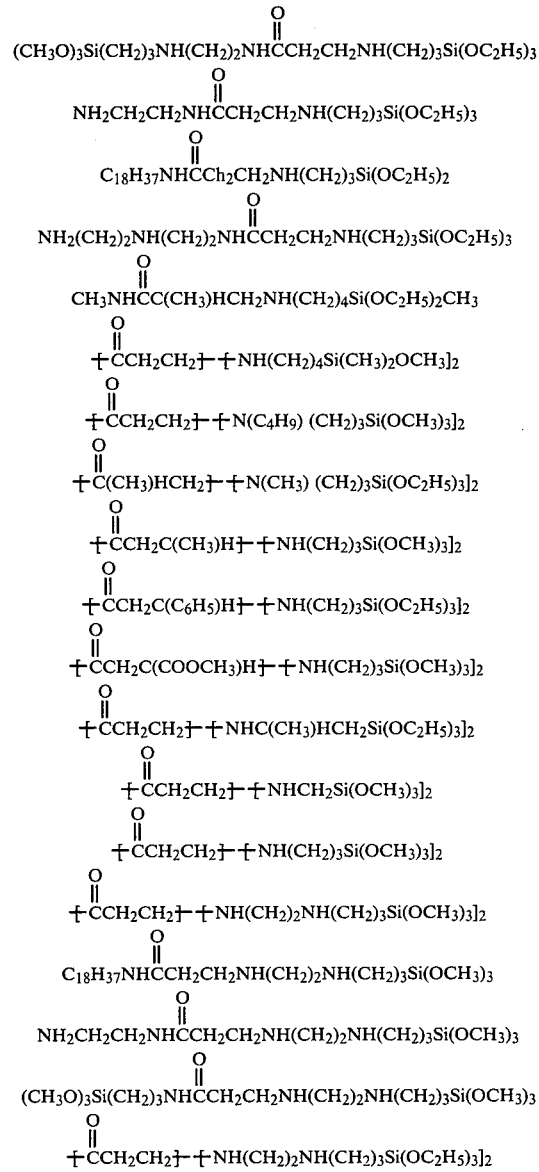

and the like. The most preferred aminoorganosilicon compounds used in this invention are the bis-silyl compounds.

The hydroxyl-containing organic polymer/aminoorganosilicon acylamino compositions of this invention are uniformly blended solutions containing about 5 to about 50 parts by weight, and more preferably about 10 to about 40 parts by weight of the aminoorganosilicon acylamino compound per 100 parts by weight of the organic polymer, and can be prepared by merely mechanically mixing said ingredients together along with other various conventional components that may be included if desired in the room temperature curable compositions. The particular design of mixing equipment and the method and order of the various components is not critical, although it is preferred to add the aminoorganosilicon acylamino compound to a solution of the organic polymer and additional ingredients when employed. In addition since the compositions of this invention are reactive in the presence of water the mixing of the various components should be conducted under substantially anhydrous type conditions, such as closing the equipment so that the ambient atmosphere can be controlled. Moreover, since the compositions of this invention are mildly basic in nature, it is desirable to exclude or control their contact with any acidic or potentially acidic environmental components such as $SO_2$, $CO_2$, or HCl which may be in the atmosphere. It may also be desirable to dry or dehydrate any additional components which are added.

As indicated above the compositions of this invention may also contain additional components so long as they and/or their amounts would not destroy the basic concept of this invention such as alkyl silicates to increase the solids content of the cured composition without increasing the viscosity of the curable composition, fillers, pigments, dyestuffs, diluents, solvents, dispersing agents, dessicants such as molecular sieves, odorants, plasticizers, softeners, elastomeric modifiers, thermal stabilizers, antioxidants, and the like. The particular choice and amount of such additives when employed will of course merely depend on the ultimate end use desired for the compositions of this invention.

The hydroxyl containing organic polymer/aminoorganosilicon acylamino compositions of this invention have a wide variety of utility such as in the fields of coatings, laquers, paints, inks, dyes, tints, impregnations, adhesives, caulks, sealants and the like. Said compositions are especially useful as room temperature curable coating compositions which may be applied over a wide variety of substrates, such as metals, plastics, wood, cloth foam, glass, and the like, as well as over primers, by any conventional method such as by spraying, brushing, dipping, flow coating, and the like. Said compositions are particularly useful in all fields of use where cured (crosslinked) protective and/or decorative solvent resistant coatings are desired, such as in the fields of maintenance and marine coatings.

While not wishing to be bound by any particular theory of mechanism involved, it is believed that the aminoorganosilicon acylamino compound reacts with the polymer via transesterification followed by hydrolysis of the silane portion upon exposure to the ambient moisture in the air which then cures (crosslinks) into a solid film.

The most preferred coating composition of this invention are those consisting essentially of a hydroxyalkyl acrylate modified vinyl chloride polymer as defined above and an aminoorganosilicon acylamino compound or mixtures thereof as defined above, said composition containing about 5 to 50 and more preferably about 10 to 40 parts by weight of said silicon compound per 100 parts by weight of said polymer. Said preferred composition may also and more often preferably contains the following additional additives such as an organic solvent in an amount sufficient to dissolve the polymer employed; about 70 to 100 parts by weight of a pigment per 100 parts by weight of said polymer; 0 to about 70 parts by weight of a filler material per 100 parts by weight of said polymer; 0 to about 25 parts by weight of an alkyl silicate per 100 parts by weight of said polymer; and based on the total weight of the composition, 0 to about 1 percent by weight of a dispersing agent for the pigment and 0 to about 3 percent by weight of a dessicant. The most preferred hydroxyalkyl acrylate modified vinyl chloride polymers and aminoorganosilicon acylamino compounds useful in this invention have already been defined above. In general a typical coating composition will consist of about 10 to 35 percent by weight of said hydroxyalkyl acrylate modified vinyl chloride polymer based on the total weight of the composition. Of course, it is obvious that the particular additives employed are not critical and any suitable solvent, pigment, filler, alkyl silicate, dispersing agent and dessicant can be employed. In general, the preferred solvents are methylisobutyl ketone, xylene and mixtures thereof, while the preferred pigment is titanium dioxide and the preferred dessicant is molecular sieves.

The alkyl silicates are also well known in the art and include unhydrolyzed alkyl and alkoxyalkyl silicates and alkyl and alkoxyalkyl silicates hydrolyzed up to about 85 percent by weight. Alkyl silicates are produced by the reaction of silicon tetrachloride and alcohols and alkoxy alcohols, generally in a reactor equipped with a stirrer, condenser and vat scrubber. The hydrogen chloride by-product is removed by reflux which may be carried out at reduced or atmospheric pressure. Through this process, the most common products TEOS (tetraethyl orthosilicate) and Cellosolve (Trademark of the Union Carbide Corporation for monoalkyl ethers of ethylene glycol) silicate are made. Subsequently, these products may be partially hydrolyzed by the addition of water and an acid catalyst. The amount of water added determines the degree of hydrolysis in the final product. Commercially available products derived from ethanol include the unhydrolyzed TEOS, Condensed Ethyl Silicate (about 7 percent hydrolysis), Ethyl Silicate 40 (40 percent hydrolysis containing 40% $SiO_2$), and Ethyl Silicate P-18, having an 80 to 85 percent hydrolysis level.

The following examples illustrate the present invention and are not to be regarded as limitative. All parts and percentages are by weight unless otherwise specified.

For the sake of brevity in the Examples, the designations in the first column of Table I will be used in lieu of the complete description given in the second column.

TABLE I

| Designation | Composition |
|---|---|
| Polymer A | A uniformly random hydroxyl-functional terpolymer of 80% vinyl chloride mer units, 5% vinyl acetate mer units and 15% hydroxypropyl acrylate mer units. Inherent viscosity is 0.3. |
| Silane A | The crude silane reaction produce of Example A below having the formula $[+CCH_2CH_2+ +NH(CH_2)_3SiX_3]_2$ with C=O, wherein each X is individually selected from the class consisting of methoxy and ethoxy radicals |
| Silane B | The crude silane reaction product of Example B below having the formula $[+CCH_2CH_2+ +NH(CH_2)_2NH(CH_2)_3Si(OCH_3)_3]_2$ with C=O |
| Silane C | The crude silane reaction product of Example C below having the formula $[+CCH_2CH_2+ +NH(CH_2)_3Si(OCH_3)_3]_2$ with C=O |
| Silane D | A silane having the formula $[(C_2H_5O)_3Si(CH_2)_3NH(CH_2)_2CNHCH_2+]_{\overline{x}}$ with C=O |
| Silane E | A silane having the formula $[(CH_3O)_3Si(CH_2)_3NH(CH_2)_2CNHCH_2+]_{\overline{x}}$ with C=O |

TABLE I-continued

| Designation | Composition |
|---|---|
| Nuosperse ® 657 | A dispersing agent supplied by Tenneco, Inc. |

EXAMPLE A

About 276.3 grams (1.25 moles) of gammaaminopropyltriethoxysilane was added to a 500 ml., 3 necked flask equipped with a mechanical stirrer, heating mantle, addition funnel, thermometer and distillation head and receiver protected by a nitrogen by-pass. About 53.8 grams (0.62 moles) of methyl acrylate was then rapidly added via a funnel with stirring and cooling at such a rate that the contents of the flask were maintained below 25° C. After addition, the contents of the flask were stirred for about 3 hours at room temperature and then about 0.66 grams (0.2 weight percent) of dibutyl tin oxide added as catalyst and the reaction mixture heated to about 135° C. to 150° C. with the appearance of refluxing alcohol (methanol and ethanol) in the distillation head. About 16.2 grams (theory 19.8 grams, assuming all the distillate to be methanol) of said alcohol mixture was removed and collected over 2.5 hours to yield about 307.7 grams (theory 310 grams) of the crude mixed methoxy-ethoxy silane reaction product.

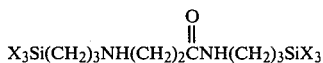

wherein each X is individually selected from the class consisting of methoxy and ethoxy radicals. An amine analysis of said silane product showed 2.01 moles N/kg. (theory 2.02 moles titratable N/kg). Gas chromatographic analysis of the elutable materials of said silane product showed it to consist of about 11.39 weight percent of alcohol (methanol and ethanol), about 7.25 weight percent of mixed methoxy-ethoxy silane $X_3Si(CH_2)_3NH_2$ wherein X is the same as defined above, about 6.27 weight percent of the mixed methoxy-ethoxy silane Michael adduct intermediate $X_3Si(CH_2)_3NHCH_2CH_2COOCH_3$ wherein X is the same as defined above, and about 71.43 weight percent of the acylamino containing mixed methoxy-ethoxy silane

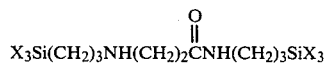

wherein X is the same as defined above, while the remainder of said product did not elute.

EXAMPLE B

About 895 grams (5.0 moles) of gamma-aminopropyltrimethoxysilane and about 215.2 grams (2.5 moles) of methyl acrylate were allowed to react, while stirring at room temperature, in a two liter, 3 necked flask having the same experimental set-up as described in Example A. After the methyl acrylate was consumed, the reaction mixture was heated to 135° C. at 100°–160 mmHg. over 4 hours and about 27.3 grams of methanol collected. The reaction mixture was cooled to room temperature and about 2.22 grams (0.2 weight percent) of dibutyl tin oxide catalyst added. The reaction mixture was then reheated to 135° C. at 80 mmHg. for two hours and an additional 62.9 grams of methanol collected (total methanol collected=90.2 grams, theory 80 grams) to yield about 1017.7 grams (theory 1030 grams) of the crude silane reaction product

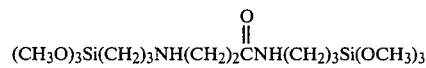

An amine analysis of said silane product showed 2.7 moles N/kg. (theory 2.42 moles titratable N/kg.). Gas chromatographic analysis of the elutable materials of said silane product showed 13.5 weight percent methanol, 11.0 weight percent of gamma-aminopropyltrimethoxysilane, and about 16.0 weight percent of the Michael addition intermediate $(CH_3O)_3Si(CH_2)_3NH(CH_2)COOCH_3$ and about 54.5 weight percent of the acylamino containing trimethoxysilane

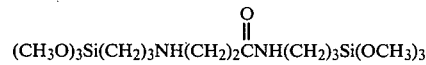

while the remainder of the product did not elute.

EXAMPLE C

Following the same procedure as described in Example A, about 151.9 grams (0.68 moles) of $(CH_3O)_3Si(CH_2)_3NH(CH_2)_2NH_2$ with an amine analysis of 8.82 moles N/kg. (theory 9.0 moles N/kg) distilled from commercial grade N-beta-(aminoethyl)-gamma-aminopropyltrimethoxysilane was allowed to react while stirring and cooling to maintain the temperature at about room temperature with about 28.4 grams (0.33 moles of methyl acrylate). After one hour amine analysis of the reaction mixture was about 7.27 moles N/kg. (theory 6.49 moles titratable N/kg.). Nuclear magnetic resonance analysis indicated total disappearance of acrylate protons, but the retention of the carboxymethoxy methyl group protons while the concentration of -NH- protons and the remainder of the spectrum was consistent with the Michael addition adduct structure.

The reaction mixture was then heated to 150° C. for 4 hours, distilling 6.0 grams of methanol. A nuclear magnetic resonance analysis at this point of the experiment indicated greater than 90% methanol formation (or less than 10% carbomethoxy methyl group remaining). The distillation was completed under vacuum producing an additional 6.2 grams of methanol (total methanol 12.2 grams, theory 10.6 grams) and yielding about 159.7 grams (theory 164.3 grams) of the crude silane reaction product

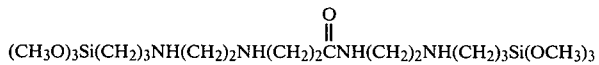

An amine analysis of said silane product showed 5.89 moles N/kg. (theory 6.02 moles titratable N/kg.). Gas chromatographic analysis of the elutable materials of said silane product showed about 1.0 weight percent methanol, about 9.9 weight percent $(CH_3O)_3Si(CH_2)_3NH(CH_2)_2NH_2$, about 4.6 weight percent of the Michael addition intermediate $(CH_3O)_3Si(CH_2)_3NH(CH_2)_2NH(CH_2)_2COOCH_3$, while the remainder of said crude silane product did not elute. Nuclear magnetic resonance analysis of the crude silane reaction product confirmed the above silane product structure.

EXAMPLES 1–5

A series of hydroxyl containing organic polymeraminoorganosilicon acylamino coating compositions were prepared having the following total formulation

| Compound | Parts by Weight |
|---|---|
| Polymer A | 24.45 |
| Titanium Dioxide | 19.09 |
| Methylisobutyl Ketone | 27.57 |
| Xylene | 27.57 |
| Nuosperse 657 | 0.32 |
| Molecular Sieves 4A | 0.5 |
| Silane* | Varied* |

*The particular Silane employed as well as the parts by weight of said Silane in the total formulation are given in Table I below.

Each coating composition was prepared by dissolving Polymer A in a solvent blend (50/50 wt. %) of methylisobutyl ketone and xylene followed by the addition of the dispersing agent and titanium dioxide pigment (the molecular sieves being added with said pigment) with stirring and the mixture ground in a pebble mill overnight. The silane compound was then added with stirring until a uniform coating composition was obtained. Each coating composition was then thinned to a No. 4 Ford cup viscosity of 20–25 seconds by the addition of a 50/50 weight percent solvent blend of methylisobutyl ketone and xylene. Each coating composition so prepared was then applied by a draw down blade to sand blasted steel panels to give a coating thickness of about 2 mils and the coatings on said panels cured by allowing them to air dry at room temperature.

The solvent resistance of each coating on said panels after having been air dried at room temperature for various periods of time was then measured by subjecting each air dried coating to double MEK rubs and the results of this test are reported in Table I below. Said test involves saturating a gauze cloth with methylethylketone and rubbing the saturated cloth back and forth (or up and down) over the air dried coating until the metal surface of the panel is exposed. For example, a numerical double MEK rub rating of five means that the metal surface of the panel was exposed after the methylethylketone saturated cloth was rubbed back and forth (2 strokes) over the coating a total of five times. Thus the higher the numerical double MEK rub rating obtained for a given coating the more solvent resistant the coating is.

TABLE I

| Ex. No. | Silane | Silane (Parts by Wt.) | Double MEK Rubs 24 hours | 48 hours | 8 Days | 10 Days | 18 Days |
|---|---|---|---|---|---|---|---|
| 1 | A | 5.09 | 5 | — | 11 | — | 14 |
| 2 | B | 5.09 | 100+ | — | 100+ | — | 100+ |
| 3 | C | 5.09 | 100+ | — | — | — | — |
| 4 | D | 5.09 | 3 | — | 7 | — | 8 |

TABLE I-continued

| Ex. No. | Silane | Silane (Parts by Wt.) | Double MEK Rubs 24 hours | 48 hours | 8 Days | 10 Days | 18 Days |
|---|---|---|---|---|---|---|---|
| 5 | E | 7.64 | 11 | 16 | — | 33 | — |

+Double MEK rubs sropped after reaching 100

The above results of Table I show that better solvent resistent coatings were obtained using silanes encompassed by this invention (i.e. Silanes A, B and C) then that obtained by the use of similar silanes (Silanes D and E) not encompassed by this invention.

Various modifications and variations of this invention will be obvious to a worker skilled in the art and it is to be understood that such modifications and variations are to be included within the purview of this application and the spirit and scope of the appended claims.

What is claimed is:

1. A substantially anhydrous, acid-free, room temperature curable composition which comprises
   (A) an organic thermoplastic polymer containing at least two hydroxyl radicals which are directly bonded to non-carboxylic carbon atoms of said polymer; and
   (B) a hydrolyzable aminoorganosilicon acylamino compound having the formula

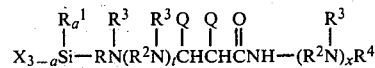

and mixtures thereof, wherein:
X is an alkoxy radical having 1 to 6 carbon atoms;
R is a divalent alkylene radical having 1 to 4 carbon atoms; $R^1$ is hydrogen or an alkyl radical having 1 to 4 carbon atoms; $R^2$ is a divalent alkylene radical having 2 to 4 carbon atoms; $R^3$ is a radical selected from the group consisting of hydrogen, an alkyl radical having 1 to 20 carbon atoms or a phenyl radical; $R^4$ is a radical selected from the group consisting of an alkyl radical having 1 to 20 carbon atoms, a phenyl radical or a silyl radical of the formula:

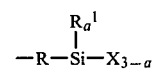

wherein X, R and $R^1$ are the same as defined above; Q is a radical selected from the group consisting of hydrogen, an alkyl radical of 1 to 4 carbon atoms, a phenyl radical or an ester radical of the formula —$COOR^5$ wherein $R^5$ is an alkyl radical having 1 to 4 carbon atoms; and wherein a has a value of 0 to 2 and t and x each have a value of 0 to 4, with the proviso that when x is at least 1, $R^4$ can also be hydrogen; and wherein said composition contains about 5 to 50 parts by weight of said hydrolyzable silicon compound (B) per 100 parts by weight of said organic polymer (A).

2. A composition as defined in claim 1, wherein $R^3$ is hydrogen; Q is hydrogen; t is 0 or 1; x is 0 and $R^4$ is an alkyl radical.

3. A composition as defined in claim 1, wherein $R^3$ is hydrogen; Q is hydrogen; t is 0 or 1; x is 1 and $R^4$ is hydrogen or an alkyl radical.

4. A composition as defined in claim 1, wherein $R^3$ is hydrogen; Q is hydrogen; t is 0 or 1; x is 0 and $R^4$ is a silyl radical of the formula $$-R-\underset{\underset{X_{3-a}}{|}}{\overset{R^1_a}{Si}}$$

wherein R, $R^1$ and X and a are the same as defined above.

5. A composition as defined in claim 4 wherein a is 0; t is 0; R is $-CH_2CH_2CH_2-$; and X is an alkoxy radical selected from the group consisting of methoxy, ethoxy and 2-methoxyethoxy radicals.

6. A composition as defined in claim 5, wherein X is a methoxy radical.

7. A composition as defined in claim 5, wherein X is an ethoxy radical.

8. A composition as defined in claim 1, wherein $R^3$ is hydrogen; Q is hydrogen; t is 0 or 1; x is 1 and $R^4$ is a silyl radical of the formula $$-R-\underset{\underset{X_{3-a}}{|}}{\overset{R^1_a}{Si}}$$

wherein R, $R^1$ and X and a are the same as defined above.

9. A composition as defined in claim 8, wherein a is 0; t is 1; R is $-CH_2CH_2CH_2-$; $R^2$ is $-CH_2CH_2-$ and X is an alkoxy radical selected from the group consisting of methoxy, ethoxy and 2-methoxyethoxy radicals.

10. A composition as defined in claim 9, wherein X is a methoxy radical.

11. A composition as defined in claim 9, wherein X is an ethoxy radical.

12. A composition as defined in claim 1 wherein the organic thermoplastic polymer is selected from the class consisting of a hydroxyalkyl acrylate modified vinyl chloride polymer, a polyether polyol polymer, a polyhydroxy containing acrylate polymer, a polyvinyl alcohol polymer, a polyhydroxy containing polyvinyl acetal polymer, a polyester polyol polymer, a phenolic resin polymer, and mixtures thereof.

13. A composition as defined in claim 12, wherein X is an alkoxy radical selected from the group consisting of methoxy, ethoxy, and 2-methoxyethoxy wherein R and $R^2$ are divalent alkylene radicals selected from the group consisting of ethylene and propylene, wherein $R^3$ and Q are hydrogen, wherein a is 0, wherein t is 0 or 1, wherein x is 0 or 1 and wherein $R^4$ is a silyl radical of the formula $$-R-Si-X_3$$

wherein R and X are the same as defined above.

14. A composition as defined in claim 13, wherein the organic thermoplastic polymer is a hydroxyalkyl acrylate modified vinyl chloride polymer.

15. A composition as defined in claim 13, wherein the organic thermoplastic polymer is a polyether polyol polymer.

16. A composition as defined in claim 13, wherein the organic thermoplastic polymer is a polyhydroxy containing polyvinyl acetal polymer.

17. A composition as defined in claim 13, wherein the organic thermoplastic polymer is a polyhydroxy containing acrylate polymer.

18. A composition as defined in claim 13, wherein the organic thermoplastic polymer is a polyvinyl alcohol polymer.

19. A composition as defined in claim 13, wherein the organic thermoplastic polymer is a polyester polyol polymer.

20. A composition as defined in claim 13, wherein the organic thermoplastic polymer is a phenolic resin polymer.

21. A composition as defined in claim 13, wherein X is methoxy, R is a propylene radical and $R^2$ is an ethylene radical.

22. A composition as defined in claim 1, wherein said composition contains about 10 to about 40 parts by weight of said hydrolyzable aminoorganosilicon acylamino compound (B) per 100 parts by weight of said organic polymer (A).

23. A composition as defined in claim 1 wherein an alkylsilicate is present as an additional ingredient.

24. A composition as defined in claim 23, wherein the alkyl silicate is tetraethyl orthosilicate.

25. A composition as defined in claim 12, which also contains an organic solvent in an amount sufficient to dissolve the organic polymer employed; about 70 to 100 parts by weight of a pigment per 100 parts by weight of said organic polymer; 0 to about 70 parts by weight of a filler material per 100 parts by weight of said organic polymer; 0 to about 25 parts by weight of an alkyl silicate; and based on the total weight of the composition 0 to about 1 percent by weight of a dispersing agent for said pigment and 0 to about 3 percent by weight of a dessicant material.

26. A composition as defined in claim 25 wherein X is an alkoxy radical selected from the group consisting of methoxy, ethoxy and 2-methoxyethoxy, wherein R and $R^2$ are divalent alkylene radicals selected from the group consisting of ethylene and propylene, wherein $R^3$ and Q are hydrogen, wherein a is 0, wherein t is 0 or 1, wherein x is 0 or 1 and wherein $R^4$ is a silyl radical of the formula $$-RSiX_3$$

wherein R and X are the same as defined above.

27. A composition as defined in claim 26, wherein the organic thermoplastic polymer is a hydroxyalkyl acrylate modified vinyl chloride polymer.

28. A composition as defined in claim 26, wherein the organic thermoplastic polymer is a polyether polyol polymer.

29. A composition as defined in claim 28, wherein the polyether polyol polymer is a phenoxy resin.

30. A composition as defined in claim 26, wherein the organic thermoplastic polymer is a polyhydroxy containing polyvinyl acetal polymer.

31. A composition as defined in claim 30, wherein the polyhydroxy containing polyvinyl acetal polymer is a polyvinylbutyral resin.

32. A composition as defined in claim 26, wherein the organic thermoplastic polymer is a polyhydroxy containing acrylate polymer.

33. A composition as defined in claim 26, wherein the organic thermoplastic polymer is a polyvinyl alcohol polymer.

34. A composition as defined in claim 26, wherein the organic thermoplastic polymer is a polyester polyol polymer.

35. A composition as defined in claim 26, wherein the organic thermoplastic polymer is a phenolic resin polymer.

36. A composition as defined in claim 27, wherein R is a propylene radical $R^2$ is an ethylene radical, and X is methoxy.

37. A composition as defined in claim 25, wherein said composition contains about 10 to about 40 parts by weight of said hydrolyzable aminoorganosilicon acylamino compound (B) per 100 parts by weight of said organic polymer (A).

38. A composition as defined in claim 25, wherein the pigment is titanium dioxide.

39. A composition as defined in claim 27, wherein the organic polymer contains (a) from about 50 to about 85 weight percent of vinyl chloride derived mer units, (b) from about 0 to 10 weight percent mer units derived from a polymerizable monomer selected from the class consisting of alkyl esters of alpha, beta-ethylenically unsaturated carboxylic acids and vinyl esters of saturated fatty acids, and (c) from 10 to 30 percent mer units derived from hydroxyalkyl acrylate.

40. A composition as defined in claim 39, wherein the organic polymer is a hydroxy-functional random terpolymer containing about 80 weight percent vinyl chloride mer units, about 5 weight percent vinyl acetate mer units and about 15 weight percent hydroxypropyl acrylate mer units.

41. A composition as defined in claim 40, wherein said composition contains about 10 to about 40 parts by weight of said hydrolyzable aminoorganosilicon acylamino compound (B) per 100 parts by weight of said organic polymer (A).

42. A composition as defined in claim 41 wherein the pigment is titanium dioxide.

43. The crosslinked polymer product obtained upon crosslinking the composition of claim 1.

* * * * *